UNITED STATES PATENT OFFICE.

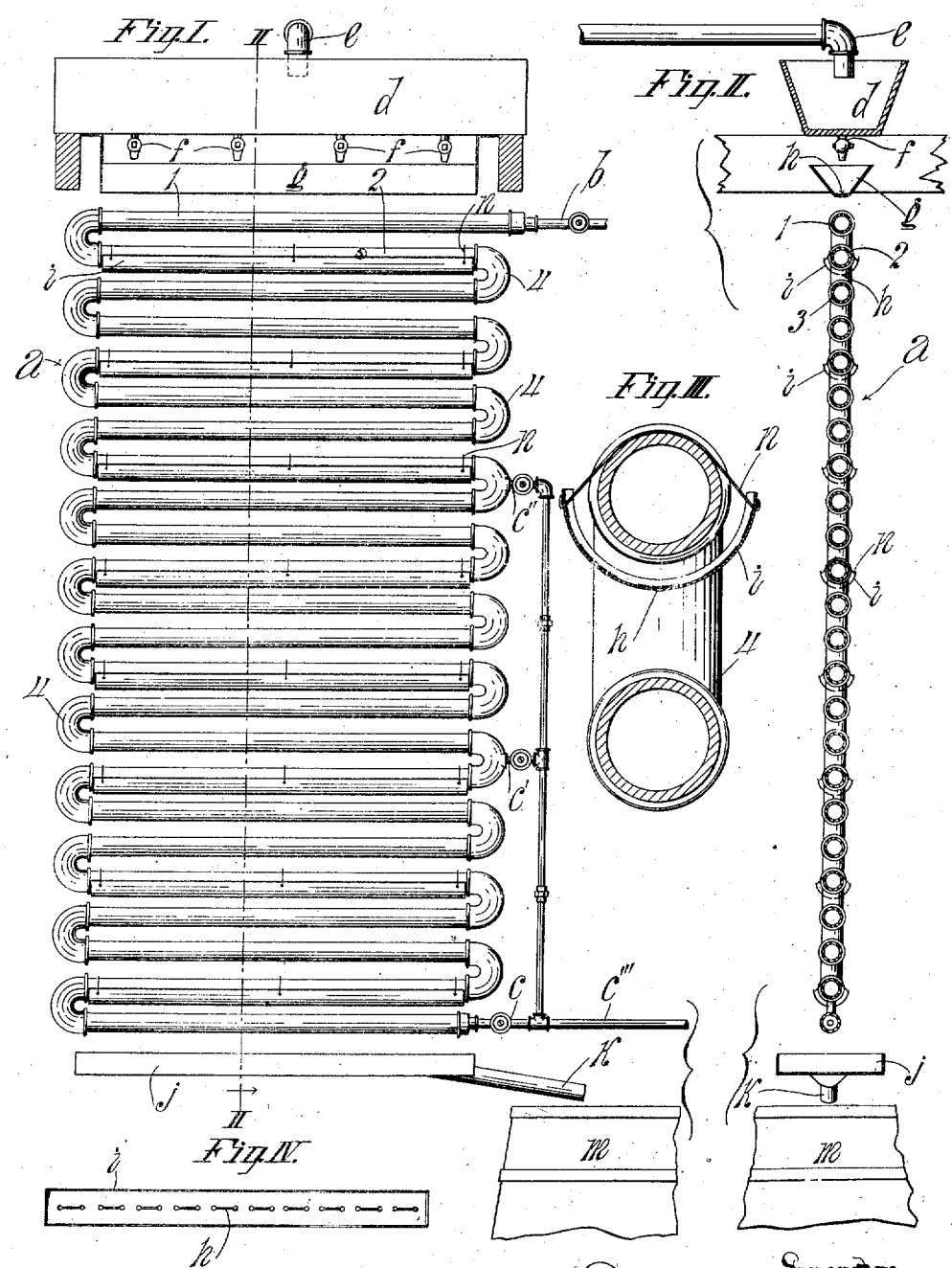

LYMAN B. DE CAMP, OF ALHAMBRA, CALIFORNIA.

METHOD OF PRODUCING PURIFIED HYDROCARBON OILS.

No. 861,232.        Specification of Letters Patent.        Patented July 23, 1907.

Application filed December 13, 1900. Serial No. 39,775.

*To all whom it may concern:*

Be it known that I, LYMAN B. DE CAMP, a citizen of the United States, residing at Alhambra, in the county of Los Angeles and State of California, have invented a new and useful Method of Producing Purified Hydrocarbon Oils, of which the following is a specification.

My method relates to treating mineral oils and more particularly that class of such oils as are found in southern California and other localities, as for instance in Los Angeles county in said State, and are known as crude petroleum. This oil may be distinguished from other crude mineral oils as it contains, in addition to the hydro-carbon oils, but few of the constituents that correspond with the lighter constituents of Pennsylvania petroleum, but on the contrary it contains water, a considerable portion of an asphaltic substance, and a light brown granular substance having a saline taste which I shall call an "emulsifying salt", all in the form of a dark colored, nontranslucent, emulsified fluid of considerable consistency. The emulsion is of such a nature that the water contained therein, which sometimes constitutes fifty per cent or over of the entire bulk or output of the well, will not readily separate from the oil. This renders the oil objectionable in many ways as the storing and transportation of so much water adds to the cost of the oil and the introduction of so much water into the fire or other place of use or consumption detracts from the actual value of the oil. The per centage of water and other impurities as emulsifying salts, in the oil can be readily determined by what is known as the gasolene test which consists in mixing with the crude oil a certain percentage of gasolene, say 100 parts of each, shaking them well to cause them to combine and then letting the mixture stand for twenty four hours in a suitable temperature, as for instance, not lower than 60° Fahrenheit, when the water and other impurities will have settled to the bottom and the oil will be on top.

I have discovered that the emulsion can be broken up and the oil quickly purified by the application of heat. I prefer to apply the heat while the crude oil is spread over a heated surface in the open air and is moving under the action of the force of gravity, whereby the water is carried off by the air and the oil is delivered at the lower edge of the surface in a purified or substantially dry condition. The amount of heat required to purify the oil will depend upon the quality of the oil and also upon the per centage of water and impurities contained therein, but it must be sufficiently high to evaporate the water so rapidly that the oil will be purified while passing over the surface without drying off any appreciable quantity of lighter particles of oil. When the emulsified crude oil or product of the well is first subjected to the heat the evaporation of the water will cause the mass to have a foamy appearance, caused by the conversion of the water within the mass into steam, but as the water becomes eliminated the foamy appearance gradually disappears which is notice to the attendant that the oil is becoming purified and that he should cut off the heat from the remaining portion of the apparatus over which the oil must pass for the reason that the continued application of heat after the foamy appearance has entirely disappeared will cause the volatilization of the oil, and especially of the lighter substances that may be present. When the oil first reaches the apparatus, as the top of a column of heated pipes, the presence of the water permits of the application thereto of a higher degree of temperature than would actually boil oil if applied directly thereto, say 302 degrees Fahrenheit, for the reason that the heat will be so rapidly taken up by the water and carried off in steam as to prevent the appreciable or detrimental volatilization of the oil. But as the amount of water in the mass decreases the heat from the coil will be taken up by the oil and any of the lighter constituents of the oil which may be present will be volatilized. For this reason it is desirable that the greatest degree of heat be applied to the oil when it first comes onto the surface or other heating apparatus and be gradually decreased as the oil becomes purified, or as it nears the bottom of the heating medium. By carrying out my method in this manner the amount of the evaporation of the water should exceed the volatilization of the oil at all times, and whenever the foamy appearance of the mass disappears the process is complete and the further application of heat will cause the volatilization of oil to exceed the evaporation of the water.

From the foregoing it is evident that it is impossible for me to limit myself to any specific degree of heat as my invention is broad enough to include a temperature so high as to volatilize a small portion of the lighter particles of oil, as might occasionally occur, but if the amount of volatilization of oil be less than the amount of evaporation of water then it falls within the scope of my invention.

In carrying out my invention it is necessary that suitable apparatus be employed, and in order that my invention may be fully understood I have shown in the accompanying drawings such an apparatus.

Figure I is a side elevation of one form of apparatus by means of which my process of producing purified mineral oil can be performed. Fig. II is a section on the line II—II of Fig. I. Fig. III is an enlarged cross-section of part of the coil showing one of the distributing devices. Fig. IV is a plan of one of the distributing devices.

In order to properly regulate the heating capacity of the coil for oils containing different proportions of water and impurities the coil is furnished with a plurality of valved escape pipes as shown at c', c''. When with a given pressure of steam, say 70 pounds, the entire coil is required to be heated for driving off the water and other impurities from the oil the valved pipe c will be opened and the valved outlets c' c'' will be closed. But when a less amount of heating surface is required to perform the work the valved outlet c will be closed and one of the valves c' or c'' opened as the case may require.

In practicing my process with the above described apparatus the steam is turned into the coil a and the outlet c is opened sufficiently to allow the water of condensation to escape. After the coil has been heated to the desired degree of temperature the several valves f are opened to allow the crude oil in the supply trough d to flow into the distributing trough g at the required speed and to be evenly distributed therein. From the narrow slits along the midline of the bottom of this trough i the oil is again evenly distributed to flow over the next member 3 of the coil, and so on to the bottom of the coil.

As the oil flows down over the apparatus the heat from the different members of the coil breaks up the emulsion and drives off the water into the surrounding atmosphere until the oil has become sufficiently purified to render it valuable for use or commerce. In this manner I have been able to take oil that was considered absolutely worthless as a fuel and practically useless for the refineries, owing to the great expense of storing and transporting the excess of water therein, and rendering it so nearly free from water and other impurities as to be A No. 1 grade of oil.

In the drawings I have shown a coil of twenty four pipe-members, one above the other and connected by the return bends 4. The pipe for a coil which I have used was an inch and a half pipe, in cross-section, each length of pipe being three feet long. This afforded an evaporating surface of approximately four hundred and thirty two square inches, and with the heat produced by steam at seventy pounds pressure, the apparatus was sufficient for the purification in twenty four hours of thirty barrels of crude oil containing fifty per cent water.

As the apparatus is easily constructed and the boiler can be heated by burning under it a portion of the oil being treated my process can be carried on at the well, thereby permitting the oil to be purified at the well and thus reducing to a minimum the cost of producing a good grade of oil from a substantially worthless product. And as the admission of steam to the coil and the flow of the oil over the pipes can be adjusted to any desired extent the process can be adapted to the different grades and qualities of oil which may be found at the different wells or which may come from the same well at different times, the disappearance of the foamy appearance indicating the completion of the process at all times.

What I claim is:

1. The process of treating the product of oil wells comprising an emulsion of asphalt, hydro-carbon oil, water and a light brown granular saline substance, all in the form of a dark colored, non-translucent fluid of considerable consistency, said process consisting in breaking up the emulsion and removing the water by passing said product over a heated surface and subjecting it to such a degree of temperature that the water will be thrown off and the oil will be delivered in a purified condition, the total evaporation of the water exceeding the volatilization of the lighter portions of the oil.

2. The process of treating the product of oil wells comprising an emulsion of asphalt, hydro-carbon oil, water and a light brown granular saline substance all in the form of a dark colored, non-translucent fluid of considerable consistency, said process consisting in breaking up the emulsion and removing the water and said saline substance by passing said product over a heated surface and subjecting it to such a degree of temperature that the total evaporation of the water will exceed the volatilization of the lighter portions of the oil.

3. The process of treating the oil of oil wells comprising an emulsion of asphalt, hydro-carbon oil, water and a light brown, granular, saline substance all in the form of a dark colored, non-translucent fluid of considerable consistency, said process consisting in breaking up the emulsion and removing the water by passing said product vertically over a heated surface and subjecting it to such a degree of temperature that the total evaporation of the water will exceed the volatilization of the lighter portions of the oil, said surface being hotter at the top than at the bottom.

4. The process of treating the product of oil wells comprising an emulsion of asphalt, hydro-carbon oil, water and a light brown granular saline substance all in the form of a dark colored non-translucent fluid of considerable consistency, said process consisting in breaking up the emulsion and removing the water by passing said product in a stream vertically over a heated coil and in breaking up said stream and redistributing it over a lower portion of the coil during said passage and subjecting the product to such a degree of temperature that the total evaporation of the water will exceed the volatilization of the lighter portions of the oil, said coil being hotter at the top than at the bottom.

5. The process of treating the product of oil wells comprising an emulsion of asphalt, hydro-carbon oil, water and a light brown granular saline substance, all in the form of a dark colored, non-translucent fluid of considerable consistency, said process consisting in breaking up the emulsion and removing the water by passing said product over a vertically arranged coil and applying a heating medium to the top of the coil and exhausting it at variant points below the inlet, the temperature of the medium and of the coil being such that the total evaporation of the water will exceed the volatilization of the lighter portions of the oil.

In testimony whereof I have signed my name to this specification in the presence of two subscribing witnesses, at Los Angeles California, this 6th day of December, 1900.

L. B. DE CAMP.

Witnesses:
James R. Townsend,
Julia Townsend.